US012486688B2

(12) United States Patent
Kim et al.

(10) Patent No.: US 12,486,688 B2
(45) Date of Patent: Dec. 2, 2025

(54) MULTI-FUNCTIONAL SUPPORT POLE ASSEMBLY

(71) Applicant: KMW INC., Hwaseong-si (KR)

(72) Inventors: Duk Yong Kim, Yongin-si (KR); In Ho Kim, Yongin-si (KR); Sang Hyo Kang, Hwaseong-si (KR); Kyo Sung Ji, Hwaseong-si (KR); Chi Back Ryu, Hwaseong-si (KR); Min Sik Park, Hwaseong-si (KR); Hee Kim, Osan-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 18/406,142

(22) Filed: Jan. 6, 2024

(65) Prior Publication Data

US 2024/0141673 A1 May 2, 2024

Related U.S. Application Data

(63) Continuation of application No. PCT/KR2022/009853, filed on Jul. 7, 2022.

(30) Foreign Application Priority Data

Jul. 7, 2021 (KR) ........................ 10-2021-0089344
Jul. 6, 2022 (KR) ........................ 10-2022-0083067

(51) Int. Cl.
*G08G 1/095* (2006.01)
*E04H 12/24* (2006.01)

(52) U.S. Cl.
CPC ............. *E04H 12/24* (2013.01); *G08G 1/095* (2013.01)

(58) Field of Classification Search
CPC ............ H01Q 1/02; H01Q 1/12; H01Q 1/246; H01Q 1/44; G08G 1/09; F21V 29/50-70; F21V 29/83; F21V 23/00
See application file for complete search history.

(56) References Cited

U.S. PATENT DOCUMENTS 7,471,213 B2 12/2008 Ellison
10,347,979 B1 7/2019 Boyle et al.
(Continued)

FOREIGN PATENT DOCUMENTS

CN 202259689 U 5/2012
CN 103370833 A 10/2013
(Continued)

OTHER PUBLICATIONS

International Search Report mailed Oct. 20, 2022 for International Application No. PCT/KR2022/009853 and its English translation.
(Continued)

*Primary Examiner* — Hasan Islam
(74) *Attorney, Agent, or Firm* — Insight Law Group, PLLC; Seung Lee

(57) ABSTRACT

The present invention relates to a multi-functional support pole assembly. In particular, the present invention provides the advantage of improving operational reliability as well as preventing deterioration of urban area appearance, by comprising: a pole body provided in a hollow form and having a plurality of antenna mounting grooves formed through cutting so as to be spaced apart at a predetermined angle in a circumferential direction such that a plurality of antenna devices can be installed in the circumferential direction; and ventilation panels which are attached to remaining portions of the antenna mounting grooves not occupied by the plurality of antenna devices, and have a plurality of ventilation holes for introducing external air into the interior of the pole body.

20 Claims, 11 Drawing Sheets

(56) References Cited

U.S. PATENT DOCUMENTS

| | | | | |
|---|---|---|---|---|
| 11,215,351 | B2 * | 1/2022 | Girouard | H01Q 1/1242 |
| 11,417,943 | B2 * | 8/2022 | Hendrix | H01Q 1/44 |
| 2007/0001872 | A1 | 1/2007 | Ellison | |
| 2010/0026604 | A1 | 2/2010 | Caldwell et al. | |
| 2015/0349399 | A1 | 12/2015 | Lasier et al. | |
| 2018/0351245 | A1 | 12/2018 | Constance et al. | |
| 2020/0136236 | A1 | 4/2020 | Colapietro et al. | |
| 2020/0388907 | A1 | 12/2020 | Colapietro | |

FOREIGN PATENT DOCUMENTS

| | | | |
|---|---|---|---|
| CN | 206674404 | U | 11/2017 |
| JP | 2014-512712 | A | 5/2014 |
| KR | 10-1455119 | B1 | 10/2014 |
| KR | 10-2016-0033567 | A | 3/2016 |
| KR | 10-2016-0033569 | A | 3/2016 |
| KR | 10-1735761 | B1 | 5/2017 |
| WO | 2017/066856 | A1 | 4/2017 |

OTHER PUBLICATIONS

Japanese Office Action dated Jan. 21, 2025 from the Japanese Patent Office for Application No. 2024-500367.

Extended European Search Report mailed on Jul. 18, 2025 from the European Patent Office for European Application No. 22838016.8.

* cited by examiner

[FIG. 1]
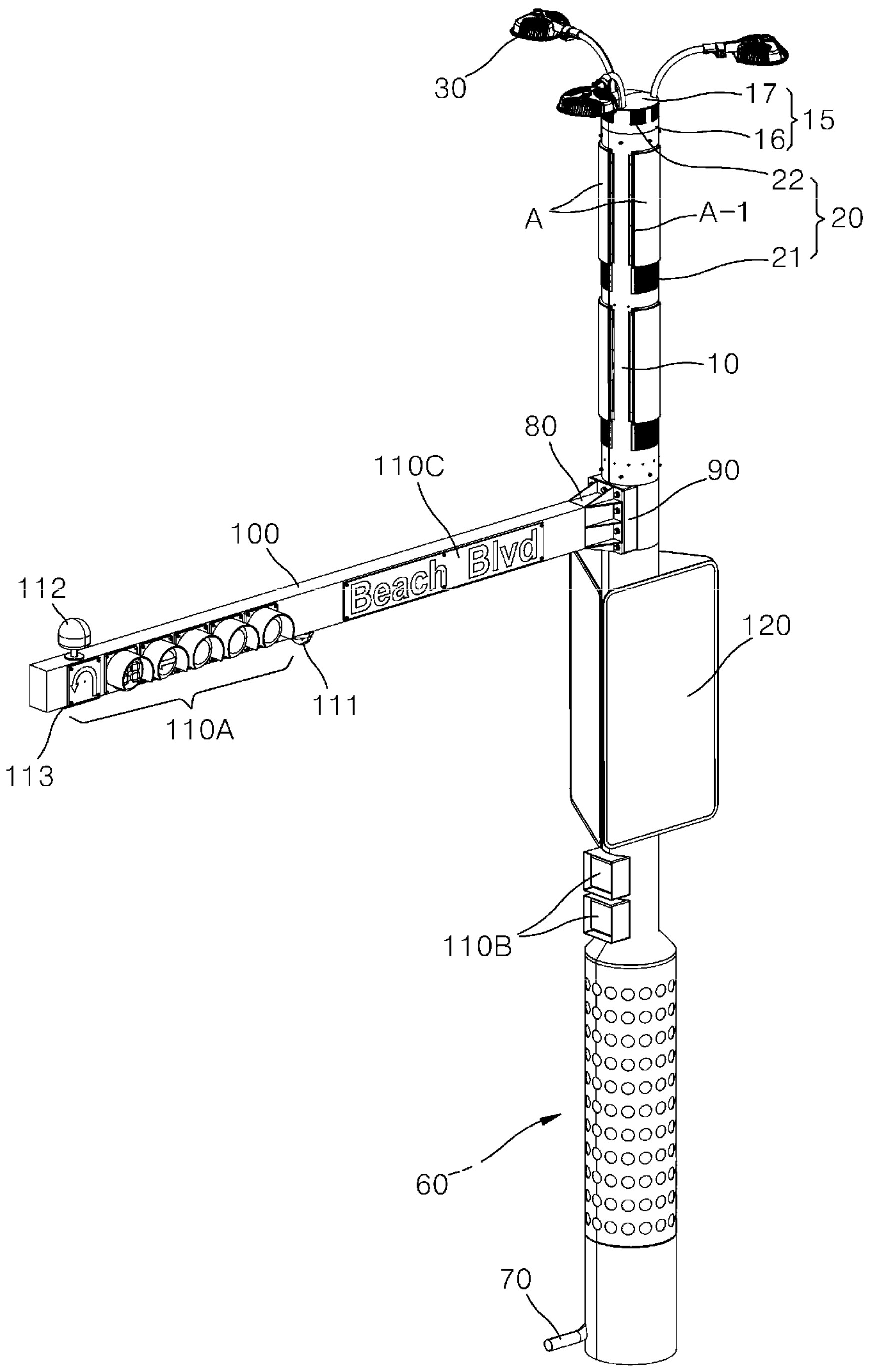

[FIG. 2]
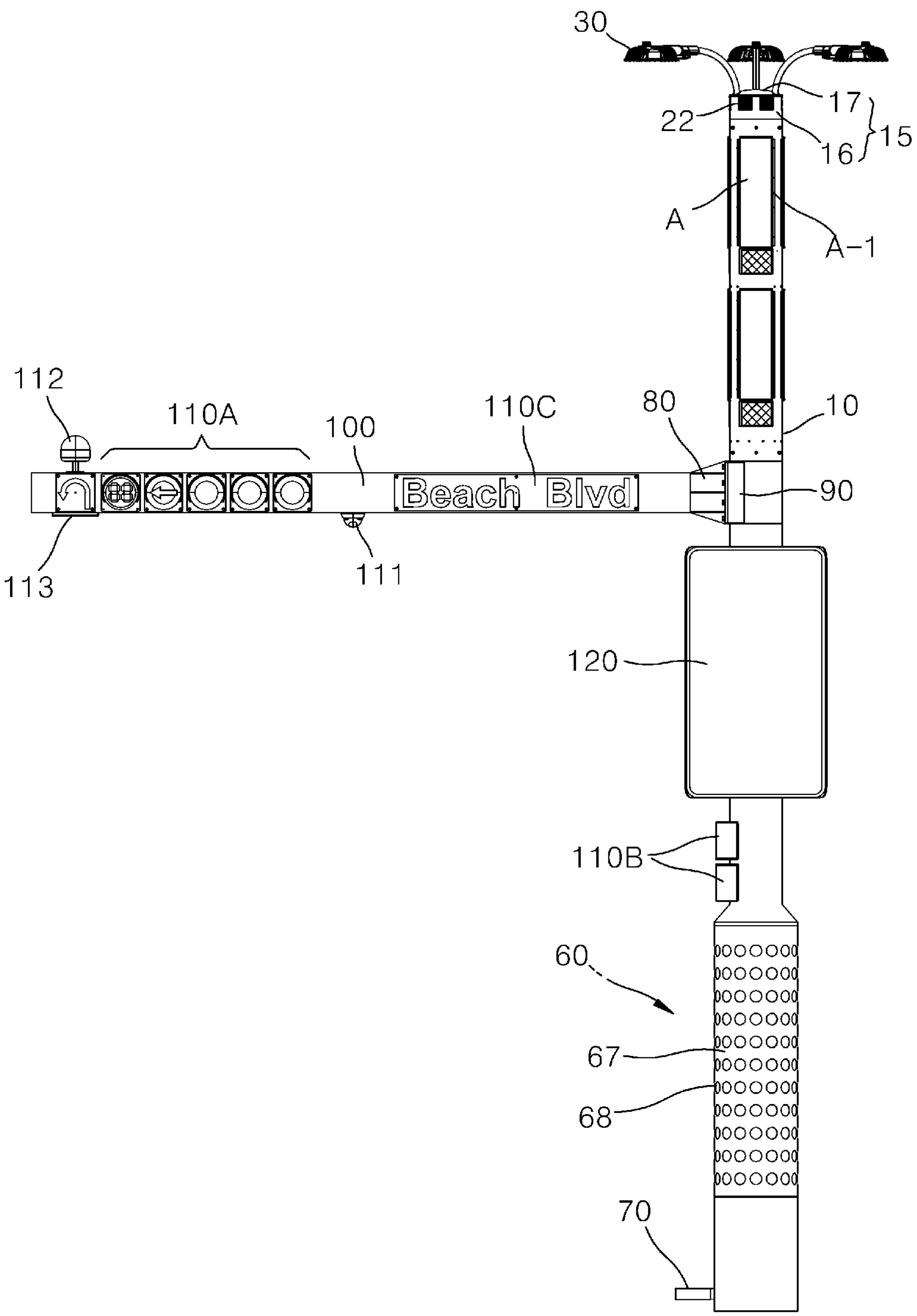

[FIG. 3]
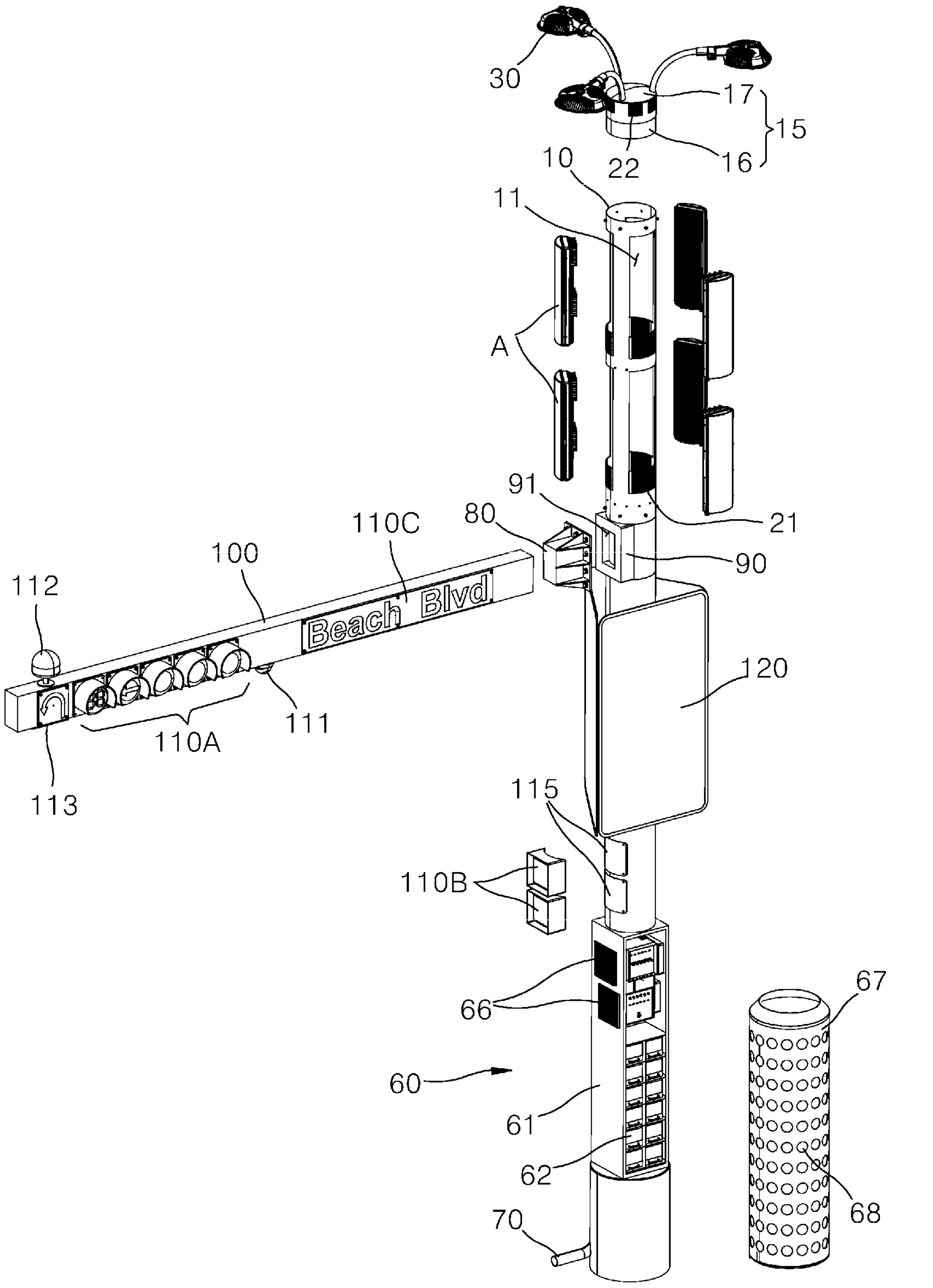

[FIG. 4]
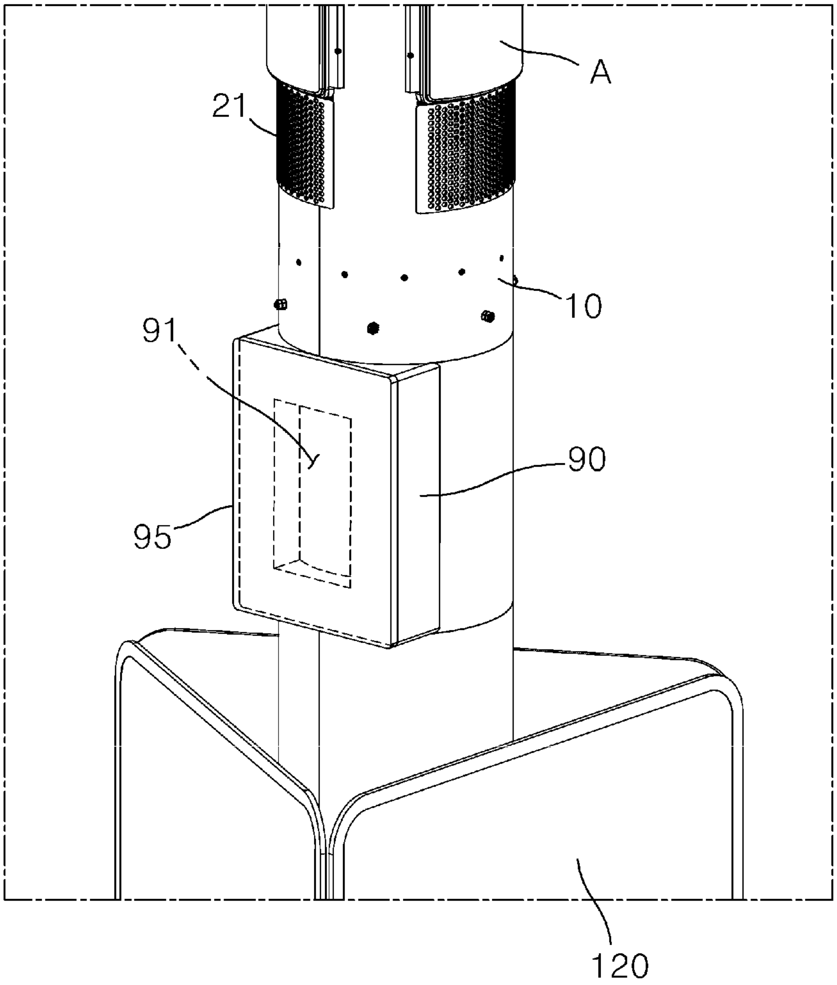

[FIG. 5]
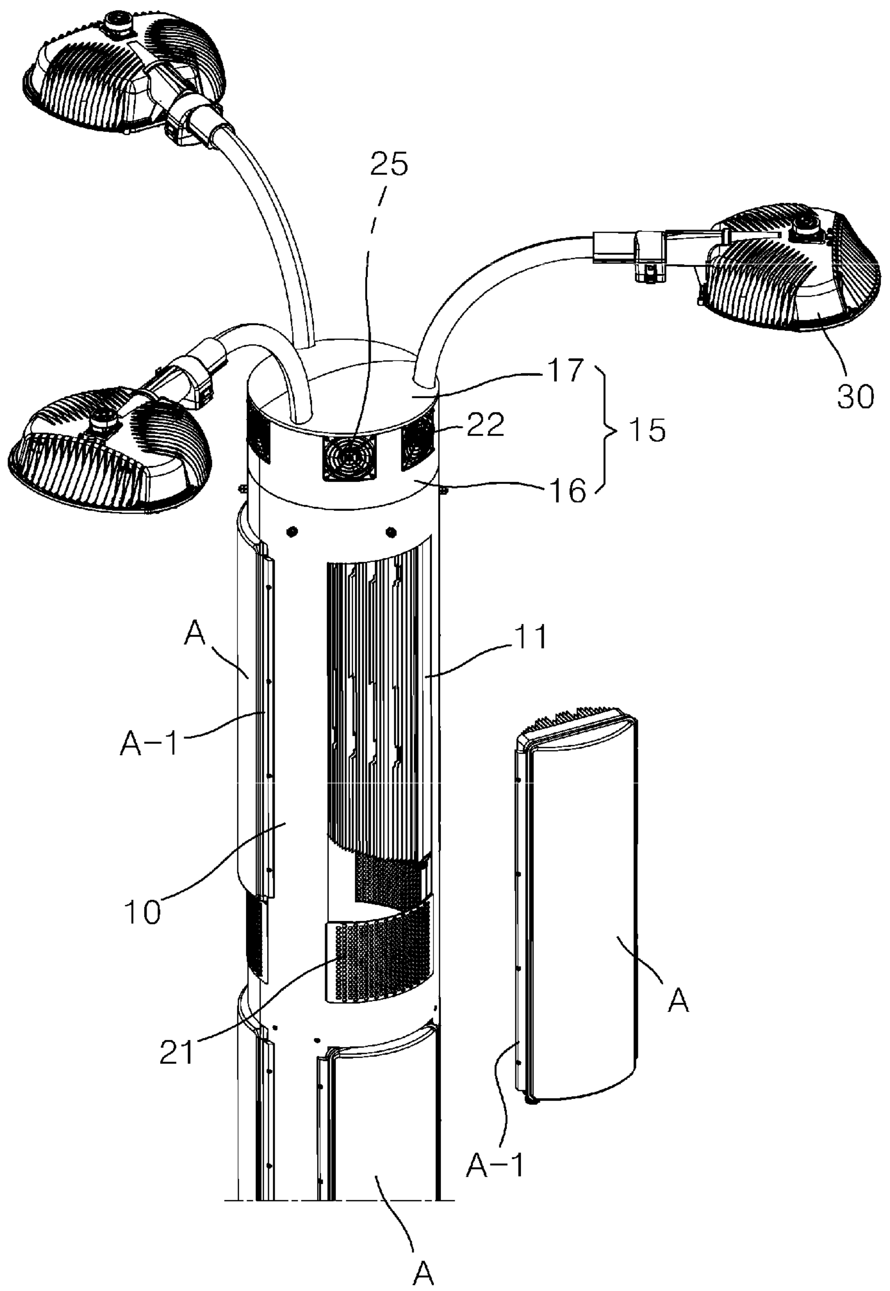

[FIG. 6]
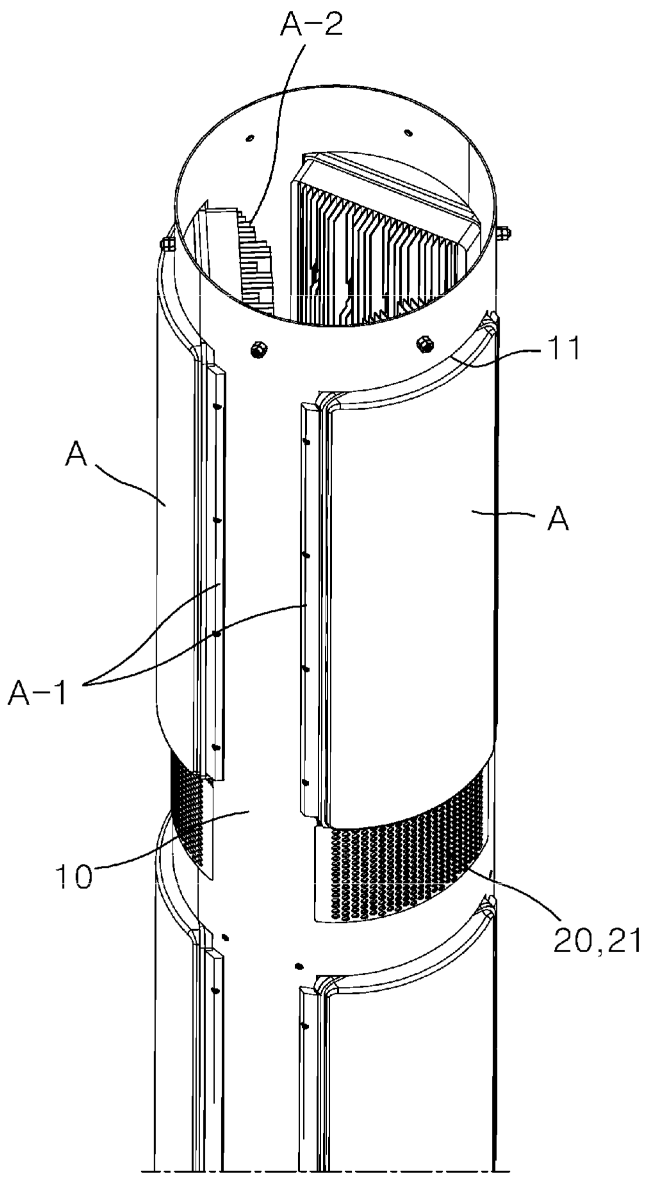

[FIG. 7]
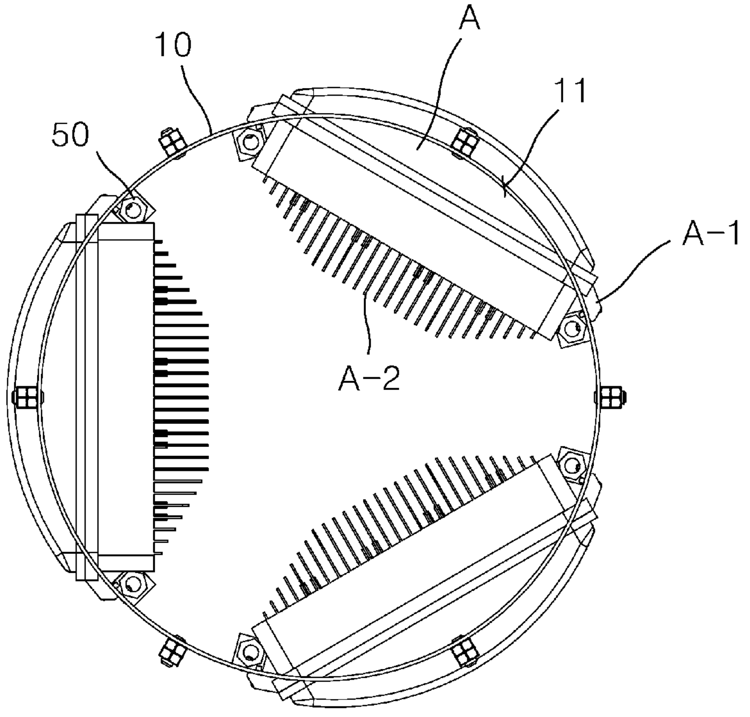

[FIG. 8]
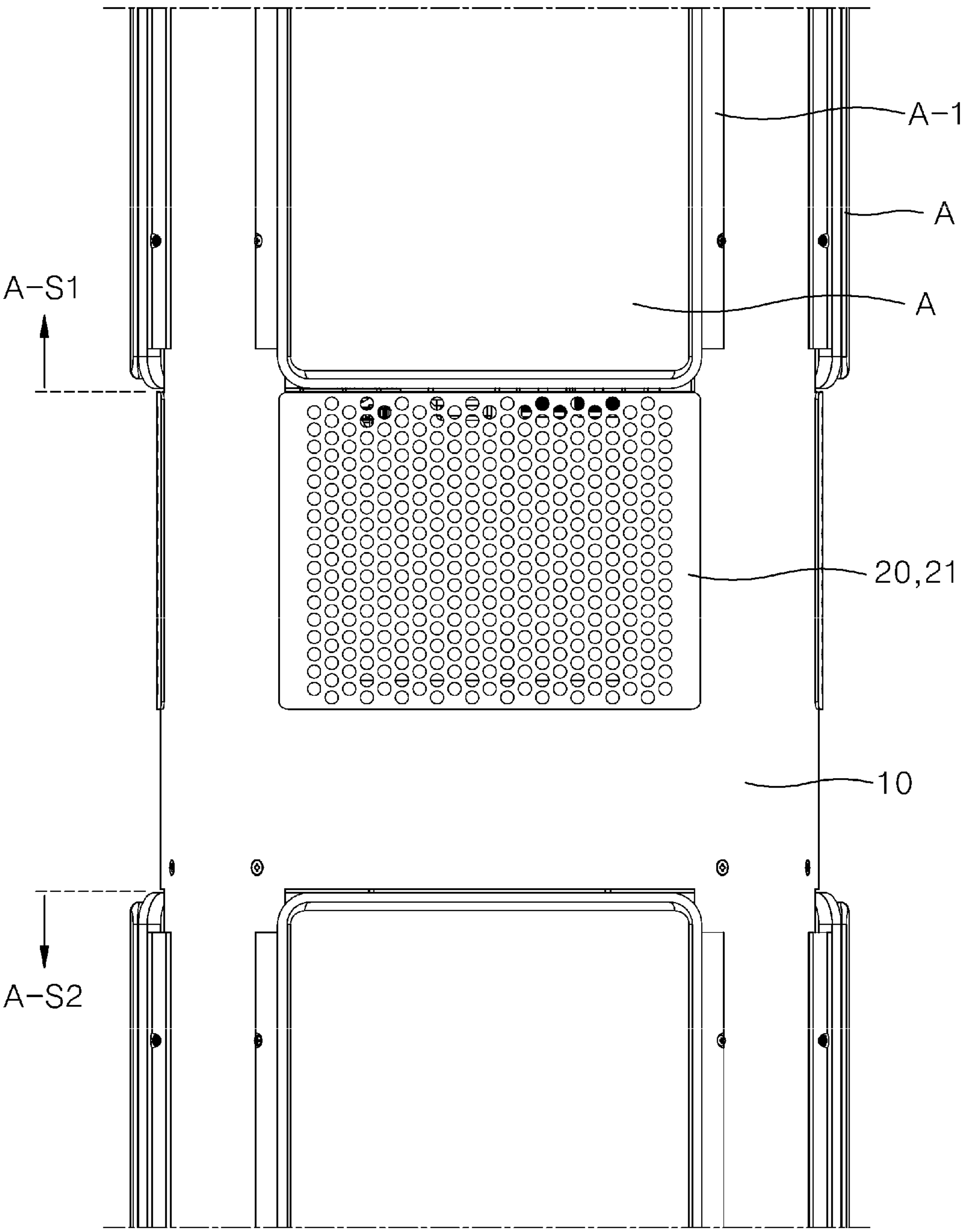

[FIG. 9]
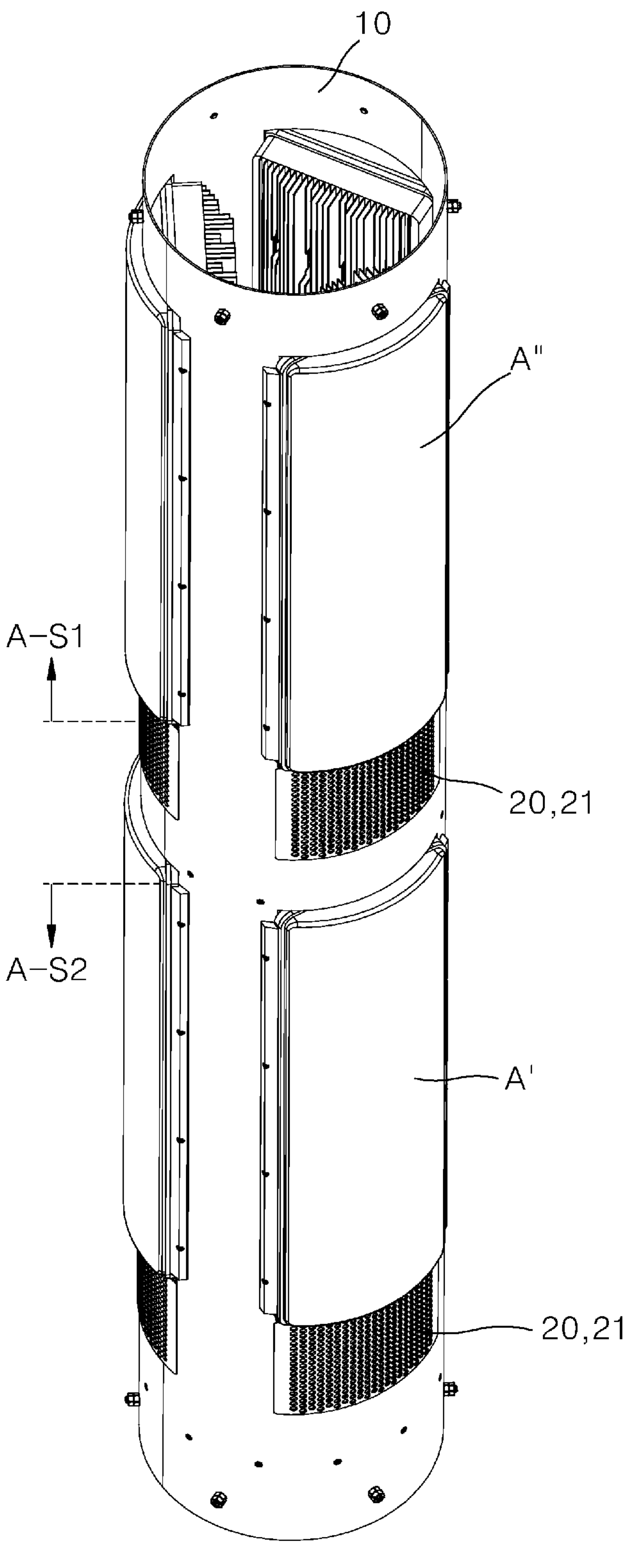

[FIG. 10]
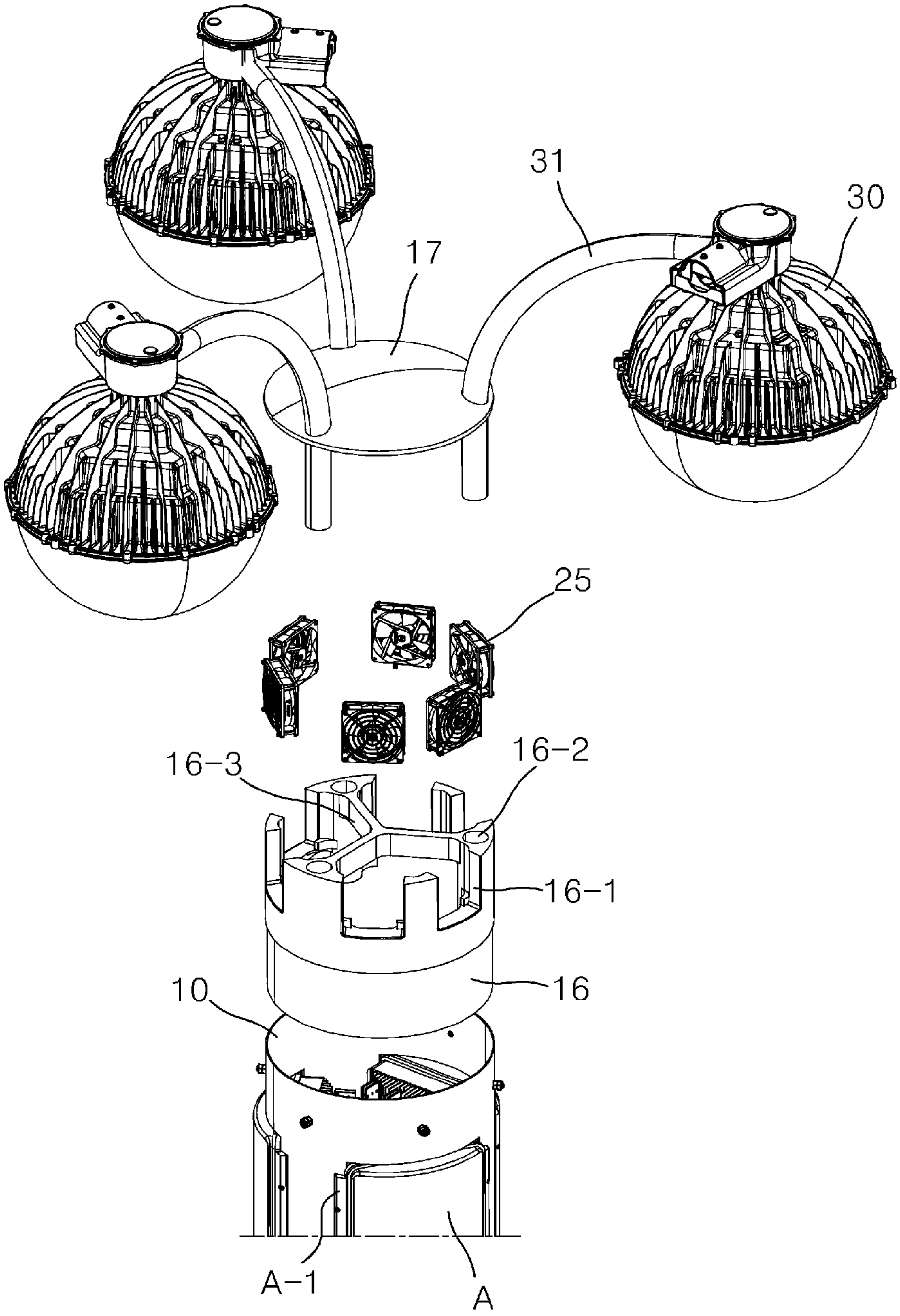

[FIG. 11]
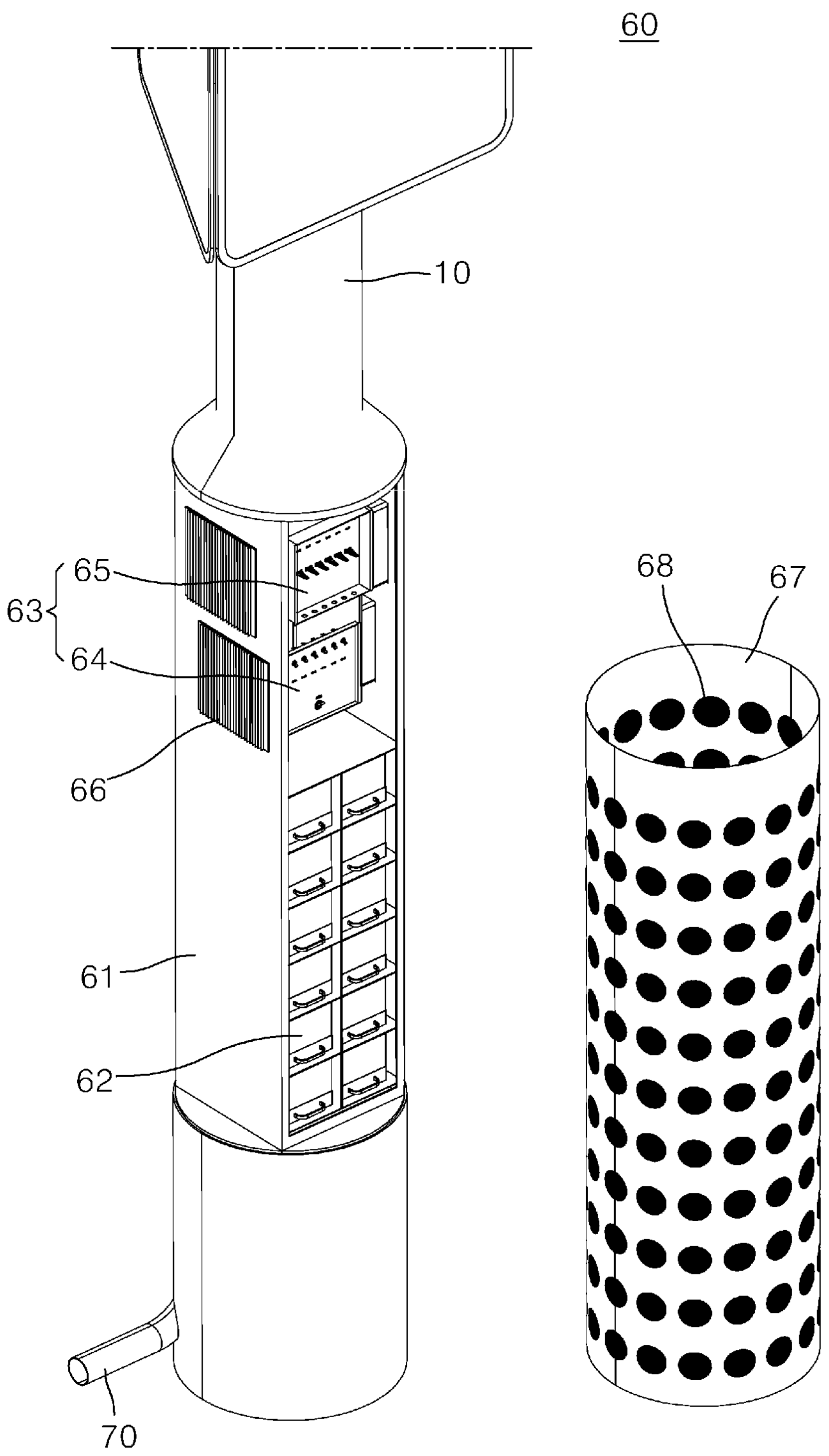

MULTI-FUNCTIONAL SUPPORT POLE ASSEMBLY

CROSS-REFERENCE TO RELATED APPLICATIONS

This application is a continuation application of International Application No. PCT/KR2022/009853, filed on Jul. 7, 2022, which claims the benefit of Korean Patent Application Nos. 10-2021-0089344, filed Jul. 7, 2021; and 10-2022-0083067, filed Jul. 6, 2022, in the Korean Intellectual Property Office, the disclosures of which are incorporated herein in their entirety by reference.

TECHNICAL FIELD

The present disclosure relates to a multi-functional support pole assembly, and more particularly, to a multi-functional support pole assembly, which can improve a product reliability and can prevent deterioration of an appearance beauty in an urban area through being installed at a crosswalk in the urban area and being provided with an uninterruptible power supply so as to be able to continue a base station service even during a power failure.

BACKGROUND ART

A wireless communication technology, for example, a multiple-input multiple-output (MIMO) technology is a technology which can dramatically increase data transmission capacity by using a plurality of antennas, and in this technology, a transmitter transmits different data through respective transmission antennas, and a receiver adopts a spatial multiplexing technique to separate pieces of transmitted data through proper signal processing.

Accordingly, with the simultaneous increase of the number of transmission/reception antennas, the channel capacity is increased, and thus more data can be transmitted. For example, in case that the number of antennas is increased to 10, about 10 times channel capacity can be secured by using the same frequency band as compared with the current single antenna system.

In 4G LTE-advanced, up to 8 antennas are used, and in the current pre-5G stage, a product mounted with 64 or 128 antennas has been developed. In 5G, it is expected that base station equipment having much more antennas is to be used, and this is called a massive MIMO technology. Whereas the current cell operation is of 2-dimension, 3D-beamforming becomes possible through introduction of the massive MIMO technology, and this is called full dimension (FD)-MIMO.

In the massive MIMO technology, as the number of antennas (ANT) is increased, the number of corresponding transmitters and filters is also increased. Nevertheless, due to the lease cost or spatial constraints of an installation place, it is reality to make RF components (antenna, filter, power amplifier, transceiver, and so on) small, light, and cheap, and the massive MIMO requires high power for coverage expansion, and the power consumption and the heat amount due to such high power may act as negative factors in reducing the weight and the size of the massive MIMO.

In particular, in case of installing the MIMO antenna, in which modules implementing RF elements and digital elements are coupled with a stacked structure, in a limited space, there is a need for a compact and miniaturized design of a plurality of layers constituting the MIMO antenna in order to maximize ease of installation or space utilization, and there is a strong need for a free direction adjustment of an antenna apparatus installed on one support pole.

Further, since a plurality of antenna devices are intensively installed on the support pole, there are problems in that the wirings become complicated and a plurality of heat sink fins formed for heat dissipation on rear parts of the antenna devices are exposed to outside as they are.

In addition, in case that a power failure occurs due to external factors, the power supply is temporarily interrupted to cause functions of the antenna devices to be paralyzed.

DISCLOSURE

Technical Problem

The present disclosure has been devised to solve the above-described technical problems, and an object of the present disclosure is to provide a multi-functional support pole assembly, which enables a plurality of antenna devices to be installed on a single support pole, and enables various kinds of wires provided for power supply to the plurality of antenna devices to be installed in a concealable manner inside the support pole.

Further, another object of the present disclosure is to provide a multi-functional support pole assembly, which enables a plurality of heat sink fins provided for heat dissipation on rear parts of a plurality of antenna devices to be installed in a concealable manner inside a support pole so as not to be exposed to the outside.

Further, still another object of the present disclosure is to provide a multi-functional support pole assembly, which can smoothly discharge heat emitted from a plurality of heat sink fins of an antenna device installed in a concealable manner inside a support pole to outside of the support pole.

Further, yet another object of the present disclosure is to provide a multi-functional support pole assembly, which includes an uninterruptible power supply so as to supply an emergency power to an antenna device even in case that a power failure occurs due to external factors.

The technical problems of the present disclosure are not limited to the above-described technical problems, and other unmentioned technical problems may be clearly understood by those skilled in the art from the following descriptions.

Technical Solution

A multi-functional support pole assembly according to an embodiment of the present disclosure includes: a pole body provided in a hollow form and having a plurality of antenna mounting grooves formed through cutting to be spaced apart at a predetermined angle in a circumferential direction so that a plurality of antenna devices are installed in the circumferential direction; and ventilation panels coupled to remaining regions of the antenna mounting grooves, the remaining regions being not occupied by the plurality of antenna devices, and having a plurality of ventilation holes formed thereon to ventilate an outdoor air into an inside of the pole body.

Here, the multi-functional support pole assembly may further include an uninterruptible power supply provided on the inside of the pole body and configured to supply a power for power operations of the plurality of antenna devices in case of a power failure.

Here, the uninterruptible power supply may be installed on an inside of an installation box integrally or separately provided on a lower end part of the pole body.

Further, the uninterruptible power supply may include a plurality of battery cells disposed to be stacked on the inside of the pole body so as to supply the power for the power operations of the plurality of antenna devices in case of the power failure.

Further, a traffic light installation bar for installing a vehicle traffic light may be further installed on a middle region of the pole body.

Further, the vehicle traffic light provided on the traffic light installation bar may be supplied with the power by a wire harness installed in a concealable manner so as not to be exposed from the inside of the pole body to an outside.

Further, the wire harness may be connected to the plurality of battery cells or an external power to supply the power.

Further, a harness clamper for clamping and arranging the wire harness may be provided on an inner periphery of the pole body.

Further, a pedestrian traffic light may be installed on a middle region of the pole body, and the pedestrian traffic light may be configured to be supplied with the power from the uninterruptible power supply during the power failure.

Further, street lamp lighting may be installed on a top part of the pole body, and the street lamp lighting may be configured to be supplied with the power from the uninterruptible power supply during the power failure.

Further, an advertising panel may be installed on a middle region of the pole body, and the advertising panel may be configured to be supplied with the power from the uninterruptible power supply during the power failure.

Further, the plurality of antenna mounting grooves may be formed to be spaced apart from one another at any one angle of 180 degrees, 120 degrees, and 90 degrees in the circumferential direction of the pole body.

Further, the plurality of antenna mounting grooves may be formed with a size in which a plurality of heat sink fins integrally formed on a rear part of the antenna device are all installed in a concealable manner on the inside of the pole body.

Further, the plurality of antenna mounting grooves may be formed in multiple stages to be spaced apart for a predetermined distance in up and down direction of the pole body.

Further, in each of the plurality of antenna devices, a screw assembly panel on which a plurality of screw through-holes are formed may be provided so as to come in contact with left and right border ends of the antenna mounting groove and to be fastened by screws, and a plurality of screw fastening holes for fastening the screws therethrough may be formed on the left and right border ends of the antenna mounting groove.

Further, the ventilation panel may be coupled to a location at which lower parts of the plurality of antenna devices installed in the antenna mounting grooves are ventilated.

Further, on an upper part of the pole body, at least one circulation fan for moving an air in up and down direction of the pole body may be provided so that inflow and outflow of an outdoor air through the ventilation panel are possible.

Further, the at least one circulation fan may be coupled to the upper part of the pole body through a pole cap coupled to a top of the pole body, and on the pole cap, a plurality of fan installation grooves cut from top to bottom may be formed so that the at least one circulation fan is installed to be arranged spaced apart in the circumferential direction.

Further, the pole cap may include: a pole cap body formed with the plurality of fan installation grooves thereon and fixed to the top of the pole body; and a pole cap cover coupled to cover an upper part of the pole cap body and integrally formed with an installation bar provided for installation of the street lamp lighting.

The ventilation panel may include: an outdoor air inflow panel coupled to the antenna mounting groove and configured to make the outdoor air flow into the inside of the pole body; and an indoor air discharge panel coupled to the top part of the pole body and configured to discharge heat on the inside of the pole body out of the pole body, and the indoor air discharge panel may be disposed to shield the fan installation groove.

Advantageous Effects

According to the multi-functional support pole assembly according to an embodiment of the present disclosure, various effects can be created as follows.

First, since the complicated wires deteriorating the appearance beauty can be installed in a concealable manner on the inside of the pole body, the appearance beauty in the urban area can be improved.

Second, since the plurality of heat sink fins formed on the rear surface of each of the plurality of antenna devices are installed in a concealable manner on the inside of the pole body, and the space occupied by the antenna device on the outside of the pole body is reduced, the management cost can be reduced.

Third, since an emergency power through the uninterruptible power supply part can be supplied to the antenna device when the power failure occurs due to the external factors, the operation reliability of the product can be improved.

DESCRIPTION OF DRAWINGS

FIG. 1 is a perspective view illustrating an installation example of a multi-functional support pole assembly according to an embodiment of the present disclosure.

FIG. 2 is a front view of FIG. 1.

FIG. 3 is an exploded perspective view of FIG. 1.

FIG. 4 is a perspective view illustrating a middle pole region in case that a traffic light installation bar is not provided among the constitutions of FIG. 1.

FIG. 5 is an exploded perspective view illustrating a shape in which a plurality of antenna devices are installed on the support pole of FIG. 1.

FIG. 6 is a perspective view illustrating a top part of a pole body after the antenna device of FIG. 5 is installed.

FIG. 7 is a plan view of FIG. 5.

FIG. 8 is a front view illustrating a ventilation panel on the support pole of FIG. 5.

FIG. 9 is a perspective view illustrating a modified installation example of FIG. 5.

FIG. 10 is an exploded perspective view illustrating an installation shape of street lamp lighting and so on among the constitutions of FIG. 5.

FIG. 11 is an exploded perspective view illustrating an uninterruptible power supply (UPS) among the constitutions of a multi-functional support pole assembly according to an embodiment of the present disclosure.

EXPLANATION OF SYMBOLS

A: antenna device A-1: screw assembly panel
A-2: heat sink fin 10: pole body
11: antenna mounting groove 15: pole cap
16: pole cap body 16-1: fan installation groove
16-2: illumination installation hole 17: pole cap cover
20: ventilation panel 21: outdoor air inflow panel

22: indoor air discharge panel 30: street lamp lighting
31: installation bar 50: harness clamper
60: uninterruptible power supply 61: installation box
62: battery cell 63: controller
64: traffic light operation panel 65: antenna device control panel
66: heat dissipation panel 67: finger guard panel
68: finger guard mesh 70: harness installation pipe
80: installation clamp 90: middle pole
91: wire hole 100: traffic light installation bar
110A: vehicle traffic light 110B: pedestrian traffic light
110C: crosswalk information panel 120: advertising panel

MODE FOR INVENTION

Hereinafter, a multi-functional support pole assembly according to an embodiment of the present disclosure will be described in detail with reference to the accompanying drawings.

In adding reference numerals to constituent elements in the drawings, it is to be noted that the same constituent elements have the same reference numerals as much as possible even if they are represented in different drawings. Further, in explaining embodiments of the present disclosure, the detailed explanation of related known constitutions or functions will be omitted if it is determined that the detailed explanation interferes with understanding of the embodiments of the present disclosure.

The terms, such as "first, second, A, B, (a), and (b)", may be used to describe constituent elements of embodiments of the present disclosure. The terms are only for the purpose of discriminating one constituent element from another constituent element, but the nature, the turn, or the order of the corresponding constituent elements is not limited by the terms. Further, unless otherwise defined, all terms (including technical and scientific terms) used herein have the same meanings as those commonly understood by those ordinary skilled in the art to which the present disclosure belongs. The terms that are defined in a generally used dictionary should be interpreted as meanings that match with the meanings of the terms from the context of the related technology, and they are not interpreted as an ideal or excessively formal meaning unless clearly defined in the present disclosure.

FIG. 1 is a perspective view illustrating an installation example of a multi-functional support pole assembly according to an embodiment of the present disclosure. FIG. 2 is a front view of FIG. 1, and FIG. 3 is an exploded perspective view of FIG. 1.

As referenced in FIGS. 1 to 3, a multi-functional support pole assembly 1 according to an embodiment of the present disclosure includes: a pole body 10 provided in a hollow cylindrical or polygonal form and having a plurality of antenna mounting grooves 11 formed through cutting to be spaced apart at a predetermined angle in a circumferential direction so that a plurality of antenna devices A are installed in the circumferential direction; and ventilation panels 20 coupled to remaining regions of the antenna mounting grooves 11, the remaining regions being not occupied by the plurality of antenna devices A, and having a plurality of ventilation holes (not denoted by a reference numeral) formed thereon to ventilate an outdoor air into an inside of the pole body 10 and to discharge an indoor air out of the pole body 10.

Here, the multi-functional support pole assembly 1 according to an embodiment of the present disclosure may not only perform a function of covering a mobile communication frequency band through simple mounting of the plurality of antenna devices A but also additionally perform a traffic control function and so on through additional installation of a traffic light installation bar 100 installed near an intersection or a crosswalk in an urban area on the pole body 10.

More specifically, on a middle region of the pole body 10, the traffic light installation bar 100 for installing a vehicle traffic light 110A may be installed in a cantilever form so as to extend in a horizontal direction.

Further, as an additional constitution according to the above-described function of the traffic control, a pedestrian traffic light 110B may be further installed on a middle region of the pole body 10 in the multi-functional support pole assembly 1 according to an embodiment of the present disclosure.

In addition, a street lamp lighting 30 may be further installed on a top part of the pole body 10, and through light emitted from the street lamp lighting 30, transportation convenience for citizens who use the intersection or the crosswalk can be provided.

Further, on a middle region of the poly body 10, an advertising panel 120 may be further installed. The advertising panel 120 can provide a strategic advantage for marketing an enterprise or product image to citizens who use the intersection or the crosswalk that is a place with high traffic of citizens.

FIG. 4 is a perspective view illustrating a middle pole region in case that a traffic light installation bar is not provided among the constitutions of FIG. 1, FIG. 5 is an exploded perspective view illustrating a shape in which a plurality of antenna devices are installed on the support pole of FIG. 1, FIG. 6 is a perspective view illustrating a top part of a pole body after the antenna device of FIG. 5 is installed, FIG. 7 is a plan view of FIG. 5, FIG. 8 is a front view illustrating a ventilation panel on the support pole of FIG. 5, and FIG. 9 is a perspective view illustrating a modified installation example of FIG. 5.

As referenced in FIGS. 4 to 9, in the multi-functional support pole assembly 1 according to an embodiment of the present disclosure, a plurality of antenna devices A may be installed in an embedded type through a plurality of antenna mounting grooves 11 formed on a pole body 10.

Here, the plurality of antenna mounting grooves 11 may be two or three antenna mounting grooves 11 provided to be spaced apart from each other in a circumferential direction of the pole body 10, and depending on the size of the installed antenna device A, four or more antenna mounting grooves 11 can be provided. That is, the plurality of antenna mounting grooves 11 may be formed to be spaced apart from each other in a manner that any one of two grooves at intervals of 180 degrees, three grooves at intervals of 120 degrees, and four grooves at intervals of 90 degrees in a circumferential direction of the pole body 10 is adopted.

In this case, it is preferable that the pole body 10 is formed with a size in which a plurality of heat sink fins A-2 integrally formed on rear parts of two, three, four, or more antenna devices A are all installed in a concealable manner on an inside of the pole body 10 when at least two or three antenna devices A are installed. As described above, since some of the rear parts of the antenna devices A provided with the plurality of heat sink fins A-2 are installed in an embedded type on the pole body 10, it is possible to create an advantage that a space occupied by the antenna devices A on an outside of the pole body 10 can be reduced.

Further, the antenna mounting grooves 11 may be formed in multiple stages to be spaced apart for a predetermined distance in up and down direction of the pole body 10, and the plurality of antenna devices A may be installed in multiple stages to be spaced apart from each other in up and down direction of the pole body 10. Accordingly, in case that three antenna devices A can be installed in the circumferential direction of the pole body 10, it is possible to create an advantage that three antenna devices A can be additionally installed in up and down direction of the pole body 10. For example, as referenced in FIGS. 8 and 9, the antenna devices A may be installed in a manner that three antenna devices A are installed at intervals of 120 degrees to be spaced apart in the circumferential direction on an upper part of the pole body 10 around a reference point indicated as A-S1, and three antenna devices A are installed at intervals of 120 degrees to be spaced apart in the circumferential direction on a lower part of the pole body 10 around a reference point indicated as A-S2.

As described above, in the support pole assembly for antenna installation according to an embodiment of the present disclosure, since some of rear end parts of the antenna devices A can be installed in an embedded type on the inside of the pole body 10, the amount of protrusion of the antenna devices A protruding out of the pole body 10 can be reduced, and since the plurality of antenna devices A can be intensively installed up and down in multiple stages on the pole body 10 corresponding to a single support pole, it is possible to create an advantage that a rental cost (e.g., space usage fee) for the support pole lessor can be reduced.

Here, some of the plurality of antenna devices A may be inserted and installed through the antenna mounting grooves 11, and a wire harness (not illustrated) connected to the plurality of antenna devices A may be installed in a concealable manner on the inside of the pole body 10. Accordingly, since the plurality of antenna devices A are intensively installed on the pole body 10 corresponding to the single support pole, the wire harness which is a factor that most significantly harms the appearance beauty is not observed from the outside, and thus deterioration of the appearance beauty around the pole body 10 can be prevented.

The wire harness may be a cable that is supplied from a harness connection pipe 70 provided to connect an external power (not illustrated) to be described later, and also may be a cable connected from an uninterruptible power supply 60 to be described later.

Meanwhile, the plurality of antenna devices A may be installed in the antenna mounting grooves 11 so that the plurality of heat sink fins A-2 integrally formed on at least the rear part are concealed on the inside of the pole body 10. The system heat of the antenna devices A, being transferred through the heat sink fins A-2 of the plurality of antenna devices A, may be heat-exchanged with an outdoor air that flows in through the above-described ventilation panels 20, and then may be discharged toward the upper part of the pole body 10 through forming of an ascending air current on the inside of the pole body 10.

For this, it is preferable that the ventilation panels 20 are coupled to the location at which lower parts of the plurality of antenna devices A installed in the antenna mounting grooves 11 are ventilated.

More specifically, the ventilation panel 20 may include: an outdoor air inflow panel 21 coupled to the antenna mounting groove 11 and configured to make the outdoor air flow into the inside of the pole body 10; and an indoor air discharge panel 22 coupled to the top part of the pole body 10 and configured to discharge heat on the inside of the pole body 10 out of the pole body 10.

Accordingly, the system heat of the antenna devices A, being dissipated through the plurality of heat sink fins A-2 of the antenna devices A on the inside of the pole body 10, may be smoothly dissipated through an air flow on the inside of the pole body 10, which includes an air inflow through the outdoor air inflow panel 21 and an air discharge through the indoor air discharge panel 22.

However, since there may be a risk of resistance in the air flow on the inside of the pole body 10 through the ventilation panels 20 due to various reasons, at least one circulation fan 25 may be further provided on the upper part of the poly body 10 for smooth air flow on the inside of the pole body 10. The at least one circulation fan 25 may move the air in up and down direction of the pole body 10 so as to make the smooth outdoor air inflow and discharge through the ventilation panel 20. This will be described in more detail later.

Meanwhile, in each of the plurality of antenna devices A, a screw assembly panel A-1 on which a plurality of screw through-holes are formed may be provided so as to come in contact with left and right border ends of the antenna mounting groove 11 and to be fastened by screws, and a plurality of screw fastening holes for fastening the screws therethrough may be formed on the left and right border ends of the antenna mounting groove 11 of the pole body 10.

Further, a harness clamper 50 for clamping and arranging a wire harness connected to each of the plurality of antenna devices A may be further provided on an inner periphery of the pole body 10. This is to prevent the occurrence of the air flow resistance by the wire harness in a state where the plurality of heat sink fins A-2 of the plurality of antenna devices A face each other toward the inside of the pole body 10 through arrangement of the complicated wire harness by using the harness clamper 50. Further, in a state where the temperature of the plurality of heat sink fins A-2 is very high, the harness clamper 50 blocks direct contact of the wire harness with the plurality of heat sink fins A-2, and thus reduces the risk of fire due to electrical short circuit occurring through melting of the wire harness covering, so that product safety can be practically secured.

Meanwhile, as compared with the installation example of FIG. 1, a modified installation example as referenced in FIG. 9 shows a case that antenna mounting grooves 11 with various sizes are formed and installed for installation of antenna devices A' and A" with various sizes. That is, the modified installation example of FIG. 9 provides an advantage that the antenna devices A' and A" from various manufacturers can be intensively installed on the single pole body 10 through matching with the different appearances (sizes) of the antenna devices A' and A" from the various manufacturers.

FIG. 10 is an exploded perspective view illustrating an installation shape of street lamp lighting and so on among the constitutions of FIG. 5, and FIG. 11 is an exploded perspective view illustrating an uninterruptible power supply (UPS) among the constitutions of a multi-functional support pole assembly according to an embodiment of the present disclosure.

As referenced in FIG. 10, the multi-functional support pole assembly 1 according to an embodiment of the present disclosure may further include a pole cap 15 coupled to the top part of the pole body 10 and configured to provide an installation place in which the above-described indoor air discharge panel 22 and/or the at least one circulation fan 25 are installed.

As referenced in FIG. 10, the pole cap 15 may include: a pole cap body 16 formed with a plurality of fan installation grooves 16-1 formed through cutting from top to bottom so that the at least one circulation fan 25 is installed to be arranged spaced apart in the circumferential direction in which the illumination installation hole 16-2, into which the installation bar 31 of the street lamp lightings 30 to be described later is inserted, is formed; and a pole cap cover 17 coupled to cover an upper part of the pole cap body 16 and integrally formed with an installation bar 31 provided for installation of a plurality of street lamp lightings 30.

Here, in the fan installation grooves 16-1 of the pole cap body 16 as the top part of the pole body 10, the above-described indoor air discharge panel 22 of the ventilation panel 20 may be installed together with the circulation fan 25.

As described above, according to the multi-functional support pole assembly 1 according to an embodiment of the present disclosure, the pole cap 15 can be installed on the top part of the pole body 10 in a simple way after the plurality of antenna devices A are once installed on the pole body 10. That is, in order to install the above-described indoor air discharge panel 22 on the top part of the pole body 10, the pole cap body 16 among the constitutions of the pole cap 15 is coupled to the pole body 10, and at least one circulation fan 25 integrally or separately provided with the indoor air discharge panel 22 is inserted and fixed into the fan installation grooves 16-1 of the pole cap body 16, and then the pole cap cover 17 integrally formed with installation bars 31 respectively connected to street lamp lightings 30 is coupled to the top part of the pole cap body 16 in a state where bottom parts of the installation bars 31 are inserted into illumination installation holes 16-2 formed on the pole cap body 16 to complete the installation.

However, on the point that the respective installation bars 31 inserted and installed into the illumination installation holes 16-2 should be provided to sufficiently support the weights of the street lamp lightings 30, as referenced in FIG. 10, the pole cap 15 may further include a support bridge 16-3 connecting the top part of the pole cap body 16 on which the illumination installation holes 16-2 are formed so that forming of the illumination installation holes 16-2 with a proper size and sufficient load support are possible in case that the diameter of the illumination installation hole 16-2 is larger than the thickness between an inner surface and an outer surface of the pole cap body 16.

The illumination installation hole 16-2 may be engraved and formed from top to bottom of the remaining part excluding a part on which the fan installation groove 16-1 is formed on the top part of the pole cap body 16, and for example, in case that six fan installation grooves 16-1 are formed in the circumferential direction and three illumination installation holes 16-2 are formed, the support bridge 16-3 may be formed in the form in which the support bridge extends from three top parts of the pole cap body 16 on which the illumination installation holes 16-2 are formed and is connected in the center.

Meanwhile, in the multi-functional support pole assembly 1 according to an embodiment of the present disclosure, as referenced in FIGS. 1 to 3, an advertising panel 120 may be further installed on a middle region of the pole body 10. The advertising panel 120 can be disposed to surround the outside of the pole body 10 in the form of a triangular pillar, or can also be provided in the form of an LED panel that receives the power from the outside.

In addition, in the multi-functional support pole assembly 1 according to an embodiment of the present disclosure, as referenced in FIGS. 1 to 4, a vehicle traffic light 110A and a pedestrian traffic light 110B may be further installed in addition to the above-described antenna devices A and street lamp lightings 30. That is, in case that the multi-functional support pole assembly 1 according to an embodiment of the present disclosure is installed in a place, such as a crosswalk or an intersection in an urban area, the vehicle traffic light 110A and the pedestrian traffic light 110B may be further installed in order to further improve convenience of location in addition to the transmission/reception relay function of the antenna devices A.

As referenced in FIGS. 1 and 2, the pedestrian traffic light 110B may be fixedly installed on the middle region of the pole body 10.

Further, as referenced in FIGS. 1 to 4, the multi-functional support pole assembly 1 according to an embodiment of the present disclosure may further include a traffic light installation bar 100 extending in a horizontal direction from the pole body 10 for installation of the vehicle traffic light 110A.

As referenced in FIGS. 1 to 4, the traffic light installation bar 100 may be horizontally installed on a middle pole 90 separately provided on the middle region of the pole body 10 through an installation clamp 80.

In particular, as referenced in FIG. 3, the middle pole 90 is provided for installation of the traffic light installation bar 100, and in case that the multi-functional support pole assembly 1 according to an embodiment of the present disclosure is not installed at the intersection or the crosswalk, the traffic light installation bar 100 is not necessary to be provided, and thus the installation clamp 80 is also not necessary to be installed. In this case, as referenced in FIG. 4, a wiring hole 91 provided for traffic light wiring on the middle pole 90 may be shielded by using a separate shield member 95.

In the same manner, the pedestrian traffic light 110B is also unnecessary to be installed, and in this case, as referenced in FIG. 3, the region where the pedestrian traffic light 110B is installed may be shielded by using a shield cover 115. Here, it is preferable that the shield member 95 and the shield cover 115 are provided with the same color as the color of the middle pole 90 or the pole body 10.

On the traffic light installation bar 100, the vehicle traffic light 110A in the form of flashing lights indicating vehicle stop, driving, or warning may be installed to be arranged horizontally, and a security camera (CCTV) 111, an emergency light 112, and a road light 113 may be installed. In particular, the emergency light 112 may perform a whistle function to inform in advance surrounding drivers of an emergency situation or passing of a fire truck or an emergency vehicle, and the road light 113 may perform a function of lighting the crosswalk for pedestrian's movement and safety at night.

Further, on the traffic light installation bar 100, a crosswalk information panel 110C may be installed to provide an installation area name of the corresponding support pole assembly 1 or place name information of the corresponding crosswalk.

Here, on the traffic light installation bar 100, a universal detachable part (not illustrated) of each constitution may be further provided so that the vehicle traffic light 110A manufactured in various specifications in accordance with the road system and situation of the area where the corresponding support pole assembly 1 is installed can be installed, or the security camera or the emergency light can be selectively and easily replaced and installed.

Meanwhile, the crosswalk information panel 110C can also be provided as an LED panel on which text and the like are electrically displaceable, and the power supply to the vehicle traffic light 110A and the crosswalk information panel 110C may be performed through the wire harness connected from the inside of the pole body 10 to the inside of the traffic light installation bar 100 through the wiring hole 91.

Meanwhile, as referenced in FIGS. 1 to 4 and 11, the multi-functional support pole assembly 1 according to an embodiment of the present disclosure may further include an uninterruptible power supply (UPS) 60. The uninterruptible power supply 60 may be provided on the side of the bottom part of the pole body 10.

External power may be supplied by wire to the constituent elements provided to be electrically driven, such as the antenna devices A, street lamp lightings 30, vehicle traffic light 110A, pedestrian traffic light 110B, and advertising panel 120, through a harness installation pipe 70 provided to extend to one side of the bottom part of the pole body 10 and to communicate with the inside of the pole body 10, and the power supplied to the inside of the pole body 10 may be supplied as an operation power through the wire harness (not illustrated) that is not exposed to the outside of the pole body 10 at all.

Meanwhile, on the bottom part of the pole body 10, a cuboidal installation box 61 for installation of the uninterruptible power supply 60 may be further provided. The installation box 61 may be formed integrally with the bottom part of the pole body 10, and may also be separately manufactured and connected to the bottom part of the pole body 10.

As referenced in FIGS. 3 to 11, the uninterruptible power supply 60 may include a plurality of battery cells 62 disposed to be stacked on the inside of the installation box 61, and a controller 63 provided with a traffic light operation panel 64 and an antenna device control panel 65.

Although not illustrated, the controller 63 may be provided with a printed circuit board on which a plurality of electronic components are mounted, and since a system heating phenomenon may occur in the plurality of electronic components mounted on the printed circuit board depending on the power supply operation, at least one heat dissipation panel 66 may be provided in the installation box 61.

In addition, as referenced in FIG. 3, the uninterruptible power supply 60 may further include a finger guard panel 67 in a cylindrical form that surrounds the outside of the installation box 61.

On the finger guard panel 67, a plurality of ventilation holes for smooth outdoor air inflow and outflow may be provided, and a finger guard mesh 68 for preventing intrusion of foreign substances (insects or trash) may be provided on the plurality of ventilation holes.

As described above, in the multi-functional support pole assembly 1 according to an embodiment of the present disclosure, the uninterruptible power supply 60 is installed on the inside of the pole body 10, and in case that an external power supply is not detected due to sudden power failure in the urban area, the internal battery cells 62 are switched as a built-in power, and the power supply is immediately performed without power failure with respect to the power-operable constituent elements (e.g., vehicle traffic light 110A, pedestrian traffic light 110B, street lamp lightings 30, and advertising panel 120), such as the antenna devices A, and thus there is an advantage of capable of improving the operation reliability of the product.

Further, since the multi-functional support pole assembly 1 according to an embodiment of the present disclosure can provide an installation place in which not only the street lamp lightings 30, the vehicle traffic light 110A, and the pedestrian traffic light 110B but also the advertising panel 20 and the uninterruptible power supply 60 can be easily modularly installed for not only module installation of the antenna devices A but also expression of the functions of major facilities in the urban area, and can install the various kinds of wire harnesses in a concealable manner on the inside of the pole body 10 so that the wire harnesses are not exposed to the outside, it can provide an advantage of preventing deterioration of the appearance beauty in the urban area.

As above, a multi-functional support pole assembly according to an embodiment of the present disclosure has been described in detail with reference to the accompanying drawings. However, embodiments of the present disclosure are not necessarily limited to the above-described embodiment, but it will be apparent that various modifications and implementation within an equal scope are possible by those of ordinary skill in the art to which the present disclosure pertains. Accordingly, the true scope of the present disclosure should be interpreted by the appended claims.

INDUSTRIAL APPLICABILITY

The present disclosure provides a multi-functional support pole assembly, in which a plurality of antenna devices are installed on a single support pole, and various kinds of wires provided for power supply to the plurality of antenna devices are installed in a concealable manner inside the support pole, and a plurality of heat sink fins provided for heat dissipation on rear parts of a plurality of antenna devices are installed in a concealable manner inside a support pole so as not to be exposed to an outside, and heat emitted from a plurality of heat sink fins of the antenna device installed in a concealable manner inside a support pole can be smoothly discharged to the outside of the support pole, and an uninterruptible power supply is included so as to supply an emergency power to the antenna device even in case that a power failure occurs due to external factors.

The invention claimed is:

1. A multi-functional support pole assembly comprising:

a pole body provided in a hollow form and having a plurality of antenna mounting grooves formed through cutting to be spaced apart at a predetermined angle in a circumferential direction so that a plurality of antenna devices are installed in the circumferential direction; and ventilation panels coupled to remaining regions of the antenna mounting grooves, the remaining regions being not occupied by the plurality of antenna devices, and having a plurality of ventilation holes formed thereon to ventilate an outdoor air into an inside of the pole body.

2. The multi-functional support pole assembly of claim 1, further comprising an uninterruptible power supply provided on the inside of the pole body and configured to supply a power for power operations of the plurality of antenna devices in case of a power failure.

3. The multi-functional support pole assembly of claim 2, wherein the uninterruptible power supply is installed on an inside of an installation box integrally or separately provided on a lower end part of the pole body.

4. The multi-functional support pole assembly of claim 2, wherein the uninterruptible power supply comprises a plurality of battery cells disposed to be stacked on the inside of the pole body so as to supply the power for the power operations of the plurality of antenna devices in case of the power failure.

5. The multi-functional support pole assembly of claim 2, wherein a traffic light installation bar for installing a vehicle traffic light thereon is installed on a middle region of the pole body in a cantilever form so as to extend in a horizontal direction.

6. The multi-functional support pole assembly of claim 5, wherein the vehicle traffic light provided on the traffic light installation bar is supplied with the power by a wire harness installed in a concealable manner so as not to be exposed from the inside of the pole body to an outside.

7. The multi-functional support pole assembly of claim 6, wherein the wire harness is connected to the plurality of battery cells or an external power to supply the power.

8. The multi-functional support pole assembly of claim 6, wherein a harness clamper for clamping and arranging the wire harness is provided on an inner periphery of the pole body.

9. The multi-functional support pole assembly of claim 2, wherein a pedestrian traffic light is installed on a middle region of the pole body, and the pedestrian traffic light is configured to be supplied with the power from the uninterruptible power supply during the power failure.

10. The multi-functional support pole assembly of claim 2, wherein a street lamp lighting is installed on a top part of the pole body, and the street lamp lighting is configured to be supplied with the power from the uninterruptible power supply during the power failure.

11. The multi-functional support pole assembly of claim 2, wherein an advertising panel is installed on a middle region of the pole body, and the advertising panel is configured to be supplied with the power from the uninterruptible power supply during the power failure.

12. The multi-functional support pole assembly of claim 1, wherein the plurality of antenna mounting grooves are formed to be spaced apart from one another at any one angle of 180 degrees, 120 degrees, and 90 degrees in the circumferential direction of the pole body.

13. The multi-functional support pole assembly of claim 1, wherein the plurality of antenna mounting grooves are formed with a size in which a plurality of heat sink fins integrally formed on a rear part of the antenna device are all installed in a concealable manner on the inside of the pole body.

14. The multi-functional support pole assembly of claim 1, wherein the plurality of antenna mounting grooves are formed in multiple stages to be spaced apart for a predetermined distance in up and down direction of the pole body.

15. The multi-functional support pole assembly of claim 13, wherein in each of the plurality of antenna devices, a screw assembly panel on which a plurality of screw through-holes are formed is provided so as to come in contact with left and right border ends of the antenna mounting groove and to be fastened by screws, and a plurality of screw fastening holes for fastening the screws therethrough are formed on the left and right border ends of the antenna mounting groove.

16. The multi-functional support pole assembly of claim 1, wherein the ventilation panel is coupled to a location at which lower parts of the plurality of antenna devices installed in the antenna mounting grooves are ventilated.

17. The multi-functional support pole assembly of claim 10, wherein on an upper part of the pole body, at least one circulation fan for moving an air in up and down direction of the pole body is provided so that inflow and outflow of an outdoor air through the ventilation panel are possible.

18. The multi-functional support pole assembly of claim 17, wherein the at least one circulation fan is coupled to the upper part of the pole body through a pole cap coupled to a top of the pole body, and on the pole cap, a plurality of fan installation grooves cut from top to bottom are formed so that the at least one circulation fan is installed to be arranged spaced apart in the circumferential direction.

19. The multi-functional support pole assembly of claim 18, wherein the pole cap comprises:

a pole cap body formed with the plurality of fan installation grooves thereon and fixed to the top of the pole body; and a pole cap cover coupled to cover an upper part of the pole cap body and integrally formed with an installation bar provided for installation of the street lamp lighting.

20. The multi-functional support pole assembly of claim 18, wherein the ventilation panel comprises:

an outdoor air inflow panel coupled to the antenna mounting groove and configured to make the outdoor air flow into the inside of the pole body; and an indoor air discharge panel coupled to the top part of the pole body and configured to discharge heat on the inside of the pole body out of the pole body, wherein the indoor air discharge panel is disposed to shield the fan installation groove.

* * * * *